(12) United States Patent
Dahlgren

(10) Patent No.: US 6,886,944 B2
(45) Date of Patent: May 3, 2005

(54) PROJECTOR BRIGHTNESS ENHANCEMENT USING RECTILINEAR APERTURES

(75) Inventor: Brett Dahlgren, Lebanon, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 11 days.

(21) Appl. No.: 10/437,544

(22) Filed: May 13, 2003

(65) Prior Publication Data

US 2004/0227909 A1 Nov. 18, 2004

(51) Int. Cl.[7] ............... G03B 21/14; G03B 21/28; G02B 26/08; G02B 26/02; H04N 5/74
(52) U.S. Cl. ............ 353/97; 353/99; 353/122; 359/223; 359/232; 359/236; 359/292; 348/771; 348/756
(58) Field of Search ............... 353/99, 97, 122; 359/223, 227, 232, 234, 236, 292; 348/771, 756; 345/108

(56) References Cited

U.S. PATENT DOCUMENTS

| 4,641,193 A | * | 2/1987 | Glenn | 348/771 |
| 4,879,602 A | * | 11/1989 | Glenn | 348/771 |
| 5,442,414 A | * | 8/1995 | Janssen et al. | 353/98 |
| 5,450,219 A | | 9/1995 | Gold et al. | 349/5 |
| 6,128,125 A | | 10/2000 | Gericke et al. | 359/298 |
| RE37,578 E | | 3/2002 | Gleckman | 353/122 |
| 6,419,365 B1 | | 7/2002 | Potekev et al. | 353/98 |
| 6,618,185 B2 | * | 9/2003 | Sandstrom | 359/292 |
| 6,724,546 B2 | * | 4/2004 | Nishimae et al. | 359/740 |

OTHER PUBLICATIONS

SID 02 Digest, Invited Paper: Advances in Contrast Enhancement for DLP Projection Displays, D. Scott Dewald, D.J. Segler, and Steven M. Penn, Texas Instruments Incorporated, DLP, pp. 1246–1249.

* cited by examiner

*Primary Examiner*—Judy Nguyen
*Assistant Examiner*—Magda Cruz

(57) ABSTRACT

A projector includes an array of micromirror light modulators and a projector light source for generating an illumination light beam along an optical path. An elongated rectilinear illumination aperture is defined at a first location along the optical path, with one or more elongated regions having a long dimension parallel to the axis. An elongated rectilinear pupil aperture is defined at an output pupil with one or more elongate pupil regions having a long dimension parallel to the axis.

26 Claims, 3 Drawing Sheets

PROJECTOR BRIGHTNESS ENHANCEMENT USING RECTILINEAR APERTURES

BACKGROUND OF THE DISCLOSURE

In order to maintain a high contrast ratio in micromirror based projection systems, the size of the projection optics' pupil is limited by the micromirror's maximum tilt angle. Typical implementations have used circular apertures which limit the system's entendue, and therefore the amount of light passed through the system.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION OF THE DISCLOSURE

Figure 1:
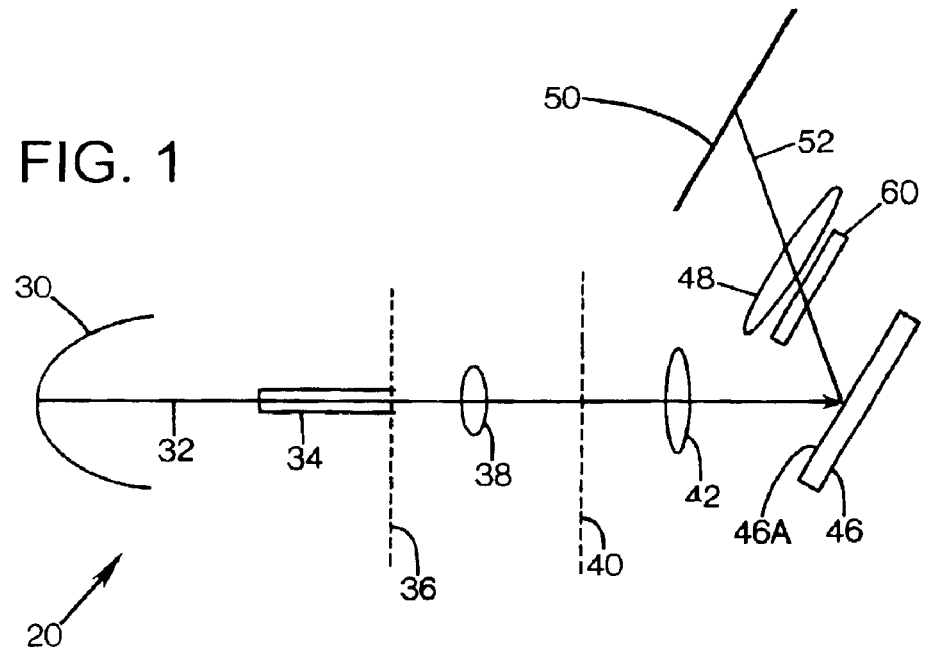
FIG. 1 is a simplified schematic diagram of an embodiment of a projector system.

In the following detailed description and in the several figures of the drawing, like elements are identified with like reference numerals.

FIG. 1 is a schematic diagram of an exemplary embodiment of a projector system 20. A light source 30, such as a lamp and parabolic reflector, generates a beam of light along optical axis 32. An integrating rod 34 is positioned on the axis, and serves to homogenize the light to provide uniform illumination on a spatial light modulator 46. The rod 34 can be omitted from the system, but performance suffers. In an exemplary embodiment, the integrating rod includes a hollow tube, e.g. of square, rectangular or circular cross-sectional configuration with interior mirrored surfaces. The output end of the rod is at a first object plane 36.

Figure 4:
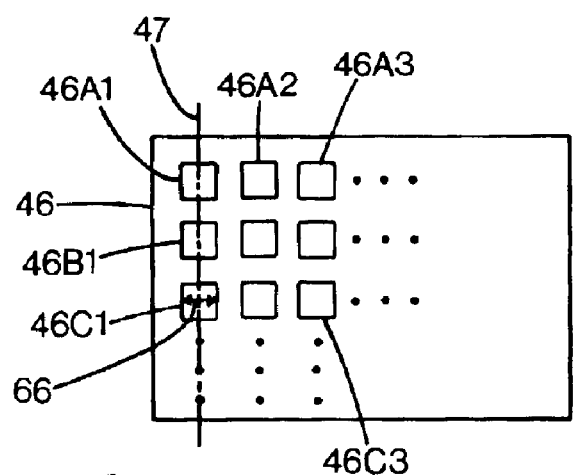
FIG. 4 is a simplified schematic illustration of an exemplary embodiment of the spatial light modulator.

A first lens 38 is positioned on the optical axis 32 downstream of the first object plane 36. A second object plane 40 is located between the first lens 38 and a second lens 42. A spatial light modulator (SLM) 46 is positioned downstream of the second lens. In an exemplary embodiment, the SLM is an array of movable micromirrors. FIG. 4 is a simplified schematic depiction of one embodiment, wherein the individual mirrors 46A1 . . . 46C3 are arranged in rows and columns. Each mirror controls the on/off status of a pixel location for the SLM. The mirrors are each movable or tiltable about an axis from an "on" position and an "off" position. For example, mirror 46C1 is tiltable about axis 47 in directions 66 (FIG. 4). Such micromirror arrays are known in the art. In an "on" position (shown in FIG. 1), individual mirrors of the SLM directs incident light through an aperture plate 60 and a projection lens 48 onto a screen 50 along reflected optical path 52. The mirrors of the SLM 46 can also be moved or tilted to an "off" position, wherein incident light reflected from the respective pixels is directed away from the screen.

The first lens 38 images the light source lamp onto the object plane 40. The second lens 42 images the plane 40 onto the pupil of the projection lens 48, in this embodiment at the aperture plate 60, described more fully below. The first lens 38 and second lens 42 image the first object plane 36 onto the surface 46A of the SLM. In an alternate embodiment, the first lens 38 and the second lens 42 can be combined into a single lens, imaging a virtual object at the pupil of the projection lens 48, i.e. at the aperture plate 60.

In order to maintain a high contrast ratio with a relatively small tilt angle for the SLM mirrors, a rectangular aperture configuration for the projection lens' pupil is employed. The long axis of the rectangular configuration is placed parallel to the axis of rotation of the mirrors of the SLM. This enables the SLM mirrors to tilt a relatively small angle and yet still direct light virtually completely out of the pupil of the projection in the off state. The illumination system can be designed to fill this rectangular pupil by gathering more light from the source lamp, by using cylindrical lenses to change the shape of the illumination systems' pupil, or by aperturing. For example, more light can be gathered by changes in the rod shape or in the gathering system. Lenses 38 and 42 can be replaced by pairs of cylindrical elements. Aperturing can be accomplished by an aperture plate placed at plane 40. The illumination system thus provides an illumination intensity distribution which is rectangular, or as will be described below, which is characterized by a plurality of thin aligned areas of high intensity, separated by thin regions of nil intensity.

Figure 2A:
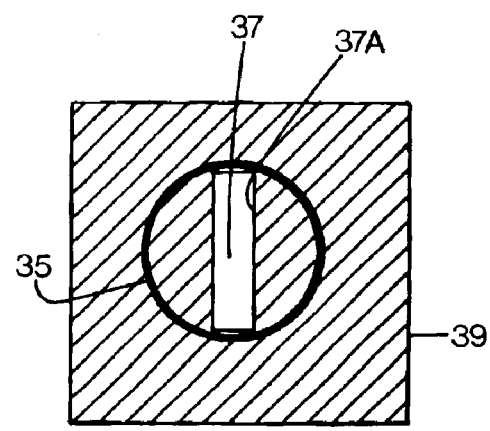
FIG. 2A shows an embodiment of a rectangular illumination aperture.
Figure 2B:
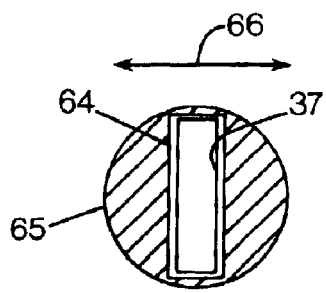
FIG. 2B illustrates an embodiment of a corresponding rectangular pupil aperture for the illumination aperture of FIG. 2A.

FIGS. 2A–2B illustrate the rectangular aperture configuration. FIG. 2A shows a rectangular illumination intensity distribution 37 at plane 40, with the unshaded area within the rectangular perimeter 37A representing the area of high intensity illumination light which is passed through the plane 40 to the lens 42. In this exemplary embodiment, an opaque aperture plate 39 is positioned at plane 40 and has an aperture in the shape of distribution 37 formed therein. The circle 35 represents the image of the lamp at plane 40, and is the conventional circular illumination aperture configuration. The shaded portion of the plate blocks incident illumination light from the rod 34 and light source, and allowed light to pass through the rectangular aperture 37. Thus, in this embodiment, some illumination light is unused, i.e. the light which impinges on the shaded area within the circle 35. In other embodiments, instead of using an aperture plate at plane 40, the illumination light could be shaped to form the rectangular illumination distribution 37, to minimize the amount of unused light. This shaping can be accomplished by cylindrical lens systems, by use of an integrating rod having a cross-sectional configuration which provides at its output end the desired intensity distribution shape, by a light source having the desired intensity distribution shape, by diffraction optics, or by combinations of these elements. In many embodiments, the cross-sectional configuration of the integrating rod will change along the length of the rod.

The lens 42 images the output end of the rod 34 onto the SLM surface 46A, to fully illuminate the active area of the SLM. In this exemplary embodiment, the output end of the rod 34 has the same or similar aspect ratio as the aspect ratio of the active area of the SLM 46. Thus, if the SLM has an active area, i.e. the area subtended by the array of micromirrors, which is circular, the output end of the rod will preferably also be circular. If the SLM active area is rectangular, then preferably the output end of the rod will also be rectangular. The magnification factor of the lenses 38 and 42 taken together provides scaling of the area of the output end of the rod 34.

FIG. 2B shows the projection lens pupil, with its rectangular aperture 64. FIG. 2B shows the superposition of the illumination aperture 37 onto the aperture 64, with the SLM 46 in the on position. In this embodiment, the aperture 64 is defined in an opaque aperture plate 65, positioned at the entrance pupil to the projection lens 48. While lens 48 is depicted as a single lens element, in some applications, this can be replaced by a compound lens system. The direction of tilt of the SLM mirror is indicated by arrow 66. The conventional circular aperture at the projection lens pupil is indicated by the periphery of the shaded area of plate 65 in FIG. 2B. It can be seen that the angular range of motion needed to position the aperture illumination outside the aperture 64 is substantially reduced over the range of motion needed for the same purpose using conventional circular aperture configurations. This is in view of the smaller extent of the rectangular apertures relative to the circular apertures. The height of the narrow apertures is about the same as the height of the image of the light source lamp. In an exemplary embodiment, the height is about 20 mm, which is the diameter of the lamp image (35). The width of the narrow apertures in an exemplary embodiment is in the range of about 3 mm to about 7 mm.

Figure 3A:
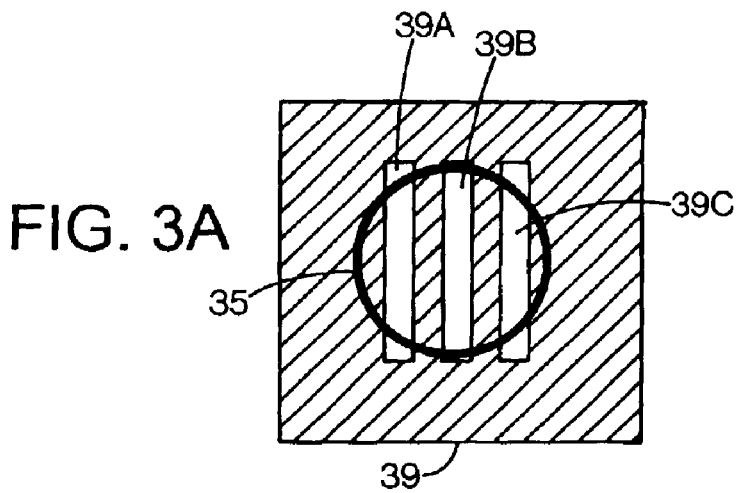
FIG. 3A shows an alternate embodiment of a rectangular illumination aperture configuration.
Figure 3B:
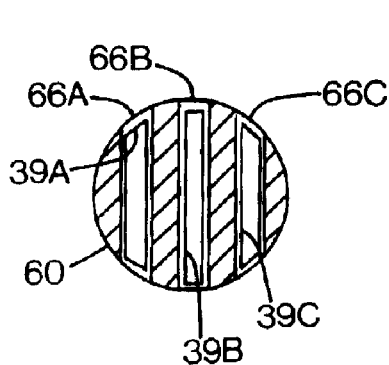
FIG. 3B shows an exemplary corresponding rectangular pupil aperture corresponding to the illumination aperture of FIG. 3A, with the spatial light modulator in an on position.
Figure 3C:
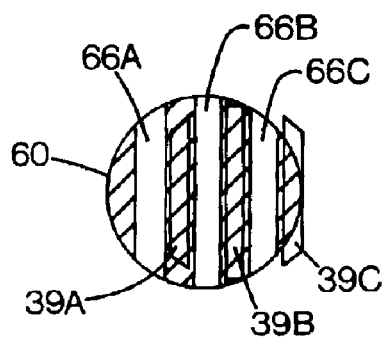
FIG. 3C is similar to FIG. 3B, but with the spatial light modulator in an off position.

FIGS. 3A–3C illustrate an alternate embodiment of a projector system in accordance with the invention. Here, the aperture configuration includes a plurality of elongated aperture regions or slits disposed in parallel arrangement. FIG. 3A shows the complex illumination distribution at plane 40 as a series of slit regions 39A, 39B, 39C formed in the aperture plate 39. The circle 35 represents the image of the light source lamp, i.e. the conventional circular illumination aperture configuration, at plane 40, as in FIG. 2A. The illumination light passed through the plate 39 at plane 40 is contained within the superposition of the slit regions and the image of the lamp at 35.

FIG. 3B shows the complex apertured illumination at a complex apertured pupil at plate 60. The pupil aperture at 60 defines a corresponding series of slit regions 66A, 66B, 66C which are ideally the same size as the projections of the illumination slit regions 39A, 39B, 39C at 60. FIG. 3B shows the illumination with an exemplary SLM mirror in the on position, and the illumination regions are centered within the pupil slit regions. FIG. 3C shows the illumination with the SLM mirror in the off position. Now the complex illumination aperture comprising high intensity regions 39A, 39B and 39C is displaced from the complex pupil aperture, so that the illumination light is blocked by opaque regions of the plate 60.

The embodiment of FIGS. 3A–3C reduces even further the necessary angular movement of the SLM mirrors between the on position and the off position. The angular motion can be reduced because the width of the slit regions can be reduced, e.g., closer to 3 mm than 7 mm in an exemplary embodiment. This complex illumination and aperture also provides increased brightness, since more of the light from the source is allowed to pass through the aperture plate. Further, the reduced angular motion will reduce stress on the SLM mirrors and increase their useful life.

Figure 5A:
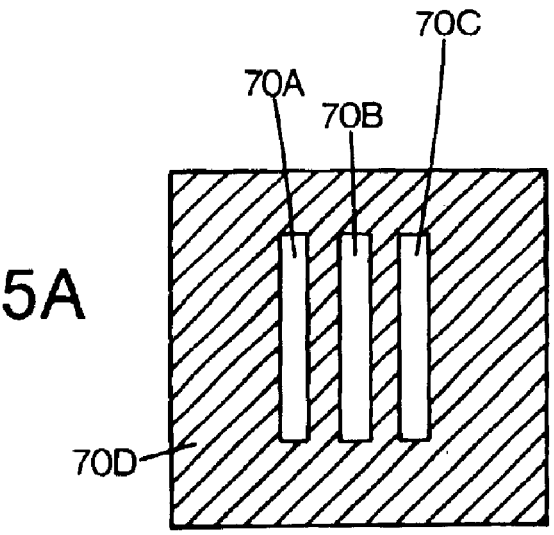
FIG. 5A shows a further alternate embodiment of a rectangular illumination aperture configuration.
Figure 5B:
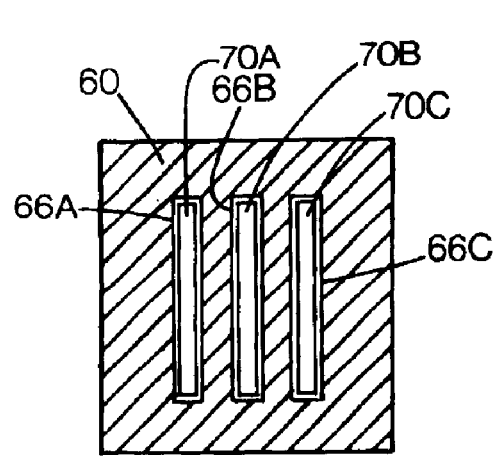
FIG. 5B shows an exemplary corresponding rectangular pupil aperture corresponding to the illumination aperture of FIG. 5A, with the spatial light modulator in an on position.
Figure 5C:
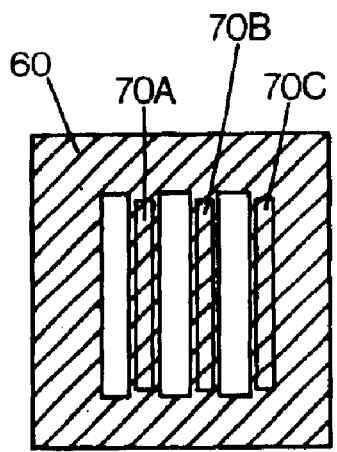
FIG. 5C is similar to FIG. 5B, but with the spatial light modulator in an off position.

While this exemplary embodiment provides the complex illumination intensity distribution by use of an aperture plate, other techniques can alternatively be employed. For example, multiple light sources, prisms or diffraction optics can be employed to generate the complex amplitude distribution. In a general sense, the projector provides an illumination aperture intensity distribution comprising one or more rectilinear regions of high light intensity. This is illustrated in FIG. 5A, wherein the illumination intensity distribution at plane 40 is represented by areas 70A, 70B and 70C of high light intensity. The cross-hatched area 70D is an area of nil intensity. FIG. 5B shows the complex apertured illumination at a complex apertured pupil at plate 60. The pupil aperture at 60 defines a corresponding series of slit regions 66A, 66B, 66C which are ideally the same size as the projections of the illumination regions 70A, 70B, 70C at 60. FIG. 5B shows the illumination with an exemplary SLM mirror in the on position, and the illumination regions are centered within the pupil slit regions. FIG. 5C shows the illumination with the SLM mirror in the off position. Now the complex illumination aperture comprising high intensity regions 70A, 70B and 70C is displaced from the complex pupil aperture, so that the illumination light is blocked by opaque regions of the plate 60.

Although the foregoing has been a description and illustration of specific embodiments of the invention, various modifications and changes thereto can be made by persons skilled in the art without departing from the scope and spirit of the invention as defined by the following claims.

What is claimed is:

1. A projector comprising:
    an array of micromirror light modulators, each light modulator comprising a mirror tiltable on an axis;
    an illumination source defining an elongated rectilinear illumination intensity distribution at a first location along an optical path, the intensity distribution comprising one or more elongated regions of high light intensity having a long dimension parallel to said axis;
    a projection lens structure disposed along the optical path at a second location downstream of said array of light modulators;
    an elongated rectilinear pupil aperture at an entrance pupil to said projection lens structure, said aperture comprising one or more elongate pupil slit regions having a long dimension parallel to said axis.

2. The projector of claim 1, wherein said elongated illumination distribution comprises a plurality of parallel elongated regions of high light intensity, and said elongated pupil aperture comprises a corresponding plurality of parallel slit regions separated by elongated narrow opaque regions.

3. The projector of claim 2, wherein each of said light modulator mirrors is tiltable on said axis between an on position wherein incident illumination light is reflected onto said pupil slit regions, and an off position wherein incident illumination light is directed onto and blocked by said opaque regions.

4. A projector comprising:
    an array of micromirror light modulators, each light modulator comprising a mirror tiltable on an axis;

an illumination source defining an elongated rectilinear illumination intensity distribution at a first location along an optical path, the intensity distribution comprising one or more elongated regions of high light intensity having a long dimension parallel to said axis;

a projection lens structure disposed along the optical path at a second location downstream of said array of light modulators;

an elongated rectilinear pupil aperture at an entrance pupil to said protection lens structure, said aperture comprising one or more elongate pupil slit regions having a long dimension parallel to said axis; and wherein said light source includes an integrating rod disposed on said optical path and having an output end disposed at a first object plane of the system.

5. The projector of claim 4, further comprising an opaque aperture plate disposed at said first location which is a second object plane, said aperture plate having said one or more elongated slit regions formed therein.

6. The projector of claim 5, further comprising a first lens disposed on said optical path between said first object plane and said second object plane, and a second lens disposed on said optical path between said second object plane and said array of light modulators, said first lens imaging the light source onto the second object plane, the first and second lens imaging the first object plane onto a surface of the array of light modulators, the second lens imaging the second object plane onto the pupil of the projection lens.

7. A projector comprising:

an array of micromirror light modulators, each light modulator comprising a mirror tiltable on an axis;

an illumination source defining an elongated rectilinear illumination intensity distribution at a first location along an optical path, the intenaity distribution comprising one or more elongated regions of high light intensity having a long dimension parallel to said axis;

a projection lens structure disposed along the optical path at a second location downstream of said array of light modulators;

an elongated rectilinear pupil aperture at an entrance pupil to said projection lens structure, said aperture comprising one or more elongate pupil slit regions having a long dimension parallel to said axis, wherein said one or more elongated regions of said illumination aperture has a narrow dimension in a range of about 3 mm to about 7 mm.

8. A projector comprising:

an array of micromirror light modulators, each light modulator comprising a mirror tiltable on an axis;

a projector light source for generating an illumination light beam along an optical path;

means for defining an elongated rectilinear illumination aperture at a first location along the optical path, the aperture comprising one or more elongated slit regions having a long dimension parallel to said axis;

a projection lens structure disposed along the optical path at a second location downstream of said array of light modulators;

means for defining an elongated rectilinear pupil aperture at an entrance pupil to said projection lens structure, said aperture comprising one or more elongate pupil slit regions having a long dimension parallel to said axis.

9. The projector of claim 8, wherein said elongated illumination aperture comprises a plurality of parallel elongated slit regions, and said elongated pupil aperture comprises a corresponding plurality of parallel slit regions separated by elongated narrow opaque regions.

10. The projector of claim 9, wherein each of said light modulator mirrors is tiltable on said axis between an on position wherein incident light is reflected onto said pupil slit regions, and an off position wherein incident light is directed onto and blocked by said opaque regions.

11. A projector comprising:

an array of micromirror light modulators, each light modulator comprising a mirror tiltable on an axis;

a projector light source for generating an illumination light beam along an optical path;

means for defining an elongated rectilinear illumination aperture at a first location along the optical path, the aperture comprising one or more elongated slit regions having a long dimension parallel to said axis;

a projection lens structure disposed along the optical path at a second location downstream of said array of light modulators;

means for defining an elongated rectilinear pupil aperture at an entrance pupil to said projection lens structure, said aperture comprising one or more elongate pupil slit regions having a long dimension parallel to said axis;

wherein said light source includes an integrating rod disposed on said optical path and having an output end disposed at a first object plane of the system.

12. The projector of claim 11, wherein said means for defining an elongated rectilinear illumination aperture comprises an opaque aperture plate disposed at said first position which is a second object plane, said aperture plate having said one or more elongated slit regions formed therein.

13. The projector of claim 12, further comprising a first lens disposed on said optical path between said first object plane and said second object plane, and a second lens disposed on said optical path between said second object plane and said array of light modulators, said first lens imaging the light source onto the second object plane, the first and second lens imaging the first object plane onto a surface of the array of light modulators, the second lens imaging the second object plane onto the pupil of the projection lens.

14. A projector comprising:

an array of micromirror light modulators, each light modulator comprising a mirror tiltable on an axis;

a projector light source for generating an illumination light beam along an optical path;

means for defining an elongated rectilinear illumination aperture at a first location along the optical path, the aperture comprising one or more elongated slit regions having a long dimension parallel to said axis;

a projection lens structure disposed along the optical path at a second location downstream of said array of light modulators;

means for defining an elongated rectilinear pupil aperture at an entrance pupil to said projection lens structure, said aperture comprising one or more elongate pupil slit regions having a long dimension parallel to said axis, wherein said elongated silt regions of said illumination aperture have a narrow dimension in a range of about 3 mm to about 7 mm.

15. An optical path structure, comprising:

a light source for directing an illumination light beam along an optical path;

a lens system disposed on the optical path for projecting an image onto an output pupil;

a spatial light modulator disposed in said optical path, said modulator having a plurality of pivotable reflective pixel elements, said pixel elements pivotable about a pivot axis and having an "on" position and an "off" position;

an illumination aperture at an optical path object plane comprising one or more elongated illumination aperture regions having parallel sides being parallel to the pivot axis and a height generally equal to a height of the light beam at the object plane; and a pupil aperture disposed at the output pupil comprising one or more elongated pupil aperture regions having parallel sides being parallel to the pivot axis and generally corresponding in size to projected images of said one or more illumination aperture regions, so that with the pixel element in the "on" position, the illumination light passes through said one or more pupil aperture regions, and with the pixel element in the "off" position, the illumination light is blocked by opaque regions of said pupil aperture.

16. The optical path structure of claim 15, wherein said elongated illumination aperture comprises a plurality of parallel elongated illumination aperture regions, and said pupil aperture comprises a corresponding plurality of parallel elongated pupil aperture regions separated by elongated narrow opaque regions, wherein a projection of said aperture regions with said pixel elements in said "on" state substantially fills said plurality of pupil aperture regions.

17. The optical path structure of claim 15, wherein said illumination aperture comprises an opaque aperture plate disposed at said object plane, said aperture plate having said one or more elongated slit regions formed therein.

18. An optical path structure, comprising:

a light source for directing an illumination light beam along an optical path;

a lens system disposed on the optical path for projecting an image onto an output pupil;

a spatial light modulator disposed in said optical path, said modulator having a plurality of pivotable reflective pixel elements, said pixel elements pivotable about a pivot axis and having an "on" position and an "off" position;

an illumination aperture at an optical path object plane comprising one or more elongated illumination aperture regions having parallel sides being parallel to the pivot axis and a height generally equal to a height of the light beam at the object plane; and a pupil aperture disposed at the output pupil comprising one or more elongated pupil aperture regions having parallel sides being parallel to the pivot axis and generally corresponding in size to projected images of said one or more illumination aperture regions, so that with the pixel element in the "on" position, the illumination light passes through said one or more pupil aperture regions, and with pixel element in the "off" position, the illumination light is blocked by opaque regions of said pupil aperture;

wherein said light source includes an integrating rod disposed on said optical path and having an output and disposed at another object plane of the system.

19. An optical path structure comprising:

a light source for directing an illumination light beam along an optical path;

a lens system disposed on the optical path for projecting an image onto an output pupil;

a spatial light modulator disposed in said optical path, said modulator having a plurality of pivotable reflective pixel elements, said pixel elements pivotable about a pivot axis and having an "on" position and "off" position;

an illumination aperture at an optical path object plane comprising one or more elongated illumination aperture regions having parallel sides being parallel to the pivot axis and a height generally equal to a height of the light beam at the object plane, wherein said illumination aperture comprises an opaque aperture plate disposed at said object plane, said aperture plate having said one or more elongated slit regions formed therein; and a pupil aperture disposed at the output pupil comprising one or more elongated pupil aperture regions having parallel sides being parallel to the pivot axis and generally corresponding in size to projected images of said one or more illumination aperture regions, so that with the pixel element in the "on" position, the illumination light passes through said one or more pupil aperture regions, and with the pixel element in the "off" position, the illumination light is blocked by opaque regions of said pupil aperture;

wherein said lens system comprises a first lens disposed on said optical path between said object plane and said another object plane, and a second lens disposed on said optical path between said object plane and said spatial light modulator, said first lens imaging the light source onto the object plane, the first and second lens imaging said object plane onto a surface of the spatial light modulators, the second said object plane onto said output pupil.

20. An optical path structure, comprising:

a light source for directing an illumination light beam along an optical path;

a lens system disposed on the optical path for projecting an image onto an output pupil;

a spatial light modulator disposed in said optical path, said modulator having a plurality of pivotable reflective pixel elements, said elements pivotable about a pivot axis and having an "on" position and an "off" position;

an illumination aperture at an optical path object plane comprising one or more elongated illumination aperture regions having parallel sides being parallel to the pivot axis and a height generally equal to a height of the light beam at the object plane; and a pupil aperture disposed at the output pupil comprising one or more elongated pupil aperture regions having parallel sides being parallel to the pivot axis and generally corresponding in size to projected images of said one or more illumination aperture regions, so that with the pixel element in the "on" position, the illumination light passes through said one or more pupil aperture regions, and with the pixel element in the "off" position, the illumination light is blocked by opaque regions of said pupil aperture;

wherein said one or more elongated slit regions of said illumination aperture have a narrow dimension in a range of about 3 mm to about 7 mm.

21. A projector system, comprising:

a light source for generating an illumination light beam along an optical path;

a lens system for projecting an image onto a projector pupil;

a spatial light modulator disposed in said optical path, said modulator having a plurality of pivotable reflective pixel elements, said pixel elements pivotable about a pivot axis and having an "on" position and an "off" position;

an illumination aperture means disposed in said light path at an object plane for defining an illumination aperture comprising one or more elongated illumination aperture regions having parallel sides being parallel to the pivot axis; and a pupil aperture means disposed in the light path for defining a pupil aperture comprising one or more elongated pupil aperture regions having parallel sides being parallel to the pivot axis and generally corresponding in size to projected images of said one or more illumination aperture regions, so that with the pixel element in the "on" position, the illumination light passes through said one or more pupil aperture regions, and with the pixel element in the "off" position, the illumination light is blocked by opaque regions of said pupil aperture means.

22. The projector system of claim 21, wherein said one or more elongated illumination aperture regions comprises a plurality of parallel elongated illumination aperture regions, and said one or more pupil aperture regions comprises a corresponding plurality of parallel elongated pupil aperture regions separated by elongated narrow opaque regions, wherein a projection of said aperture regions with said pixel elements in said "on" state substantially fills said plurality of pupil aperture regions.

23. The projector system of claim 21, wherein said illumination aperture means comprises an opaque aperture plate disposed at said object plane, said aperture plate having said one or more elongated slit regions formed therein.

24. A projector system, comprising:

a light source for generating an illumination light beam along an optical path;

a lens system for projecting an image onto a projector pupil;

a spatial light modulator disposed in said optical path, said modulator having a plurality of pivotable reflective pixel elements, said pixel elements pivotable about a pivot axis and having an "on" position and an "on" position;

an illumination aperture means disposed in said light path at an object plane for defining an illumination aperture comprising one or more elongated illumination aperture regions having parallel sides being parallel to the pivot axis; and a pupil aperture means disposed in the light path for defining a pupil aperture comprising one or more elongated pupil aperture regions having parallel sides being parallel to the pivot axis and generally corresponding in size to projected images of said one or more illumination aperture regions, so that with the pixel element in the "on" position, the illumination light passes through said one or more pupil aperture regions, and with the pixel element in the "off" position, the illumination light is blocked by opaque regions of said pupil aperture means, wherein said one or more elongated regions of said illumination aperture have a narrow dimension a range of about 3 mm to about 7 mm.

25. A projector system, comprising:

a light source for generating an illumination light beam along an optical path;

a lens system for projecting an image onto a projector pupil;

a spatial light modulator disposed in said optical path, said modulator having a plurality of pivotable reflective pixel elements, said pixel elements pivotable about a pivot axis and having an "on" position and an "off" position;

an illumination aperture means disposed in said light path at an object plane for defining an illumination aperture comprising one or more elongated illumination aperture regions having parallel sides being parallel to the pivot axis; and a pupil aperture means disposed in the light path for defining a pupil aperture comprising one or more elongated pupil aperture regions having parallel sides being parallel to the pivot axis and generally corresponding in size to projected images of said one or more illumination aperture regions, so that with the pixel element in the "on" position, the illumination light passes through said one or more pupil aperture regions, and with the pixel element in the "off" position, the illumination light is blocked by opaque regions of said pupil aperture means;

wherein said light source includes an integrating rod disposed on said optical path and having an output and disposed at another object plane of the system.

26. A projector system, comprising:

a light source for generating an illumination light beam along an optical path;

a lens system for projecting an image onto a projector pupil;

a spatial light modulator disposed in said optical path, said modulator having a plurality of pivotable reflective pixel elements, said pixel elements pivotable about a pivot axis and having an "on" position and an "off" position;

an illumination aperture means disposed in said light path at an object plane for defining an illumination aperture comprising one or more elongated illumination aperture regions having parallel sides being parallel to the pivot axis; and a pupil aperture means disposed in the light path for defining a pupil aperture comprising one or more elongated pupil aperture regions having parallel sides being parallel to the pivot axis and generally corresponding in size to projected images of said one or more illumination aperture regions, so that with the pixel element in the "on" position, the illumination light passes through said one or more pupil aperture regions, and with the pixel element in the "off" position, the illumination light is blocked by opaque regions of said pupil aperture means;

wherein said lens system comprises a first lens disposed on said optical path between said object plane and said another object plane, and a second lens disposed on said optical path between said object plane and said spatial light modulator, said first lens imaging the light source onto the object plane, the first and second lens imaging said another object plane onto a surface of the spatial light modulators, said second lens imaging said object plane onto said output pupil.

* * * * *

UNITED STATES PATENT AND TRADEMARK OFFICE
CERTIFICATE OF CORRECTION

PATENT NO. : 6,886,944 B2
DATED : May 3, 2005
INVENTOR(S) : Dahlgren

It is certified that error appears in the above-identified patent and that said Letters Patent is hereby corrected as shown below:

Column 7,
Line 56, after "with", insert -- the --.
Line 60, delete the second "and" and insert -- end --.

Column 8,
Line 33, after "second", insert -- lens imaging --.

Column 10,
Line 27, delete the second "and" and insert -- end --.

Signed and Sealed this

Twenty-fourth Day of January, 2006

JON W. DUDAS
*Director of the United States Patent and Trademark Office*